July 9, 1929.  K. R. MANVILLE  1,720,422
SHAFT COUPLING
Filed Jan. 17, 1923
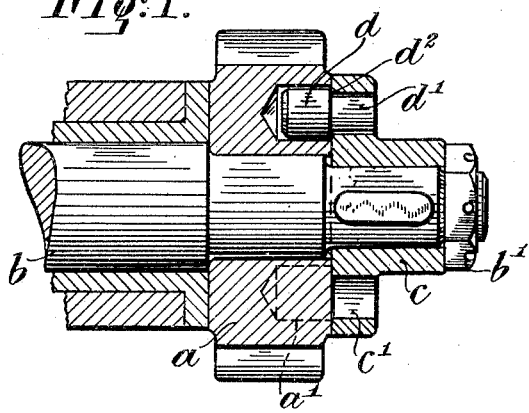
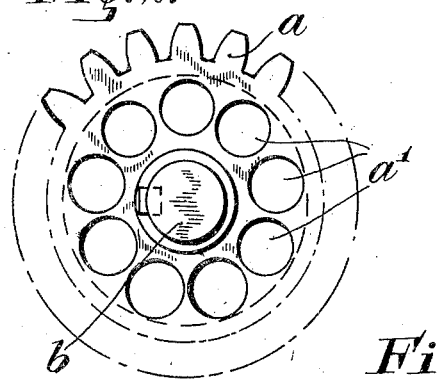
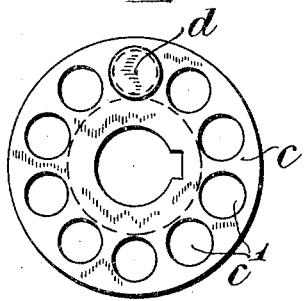
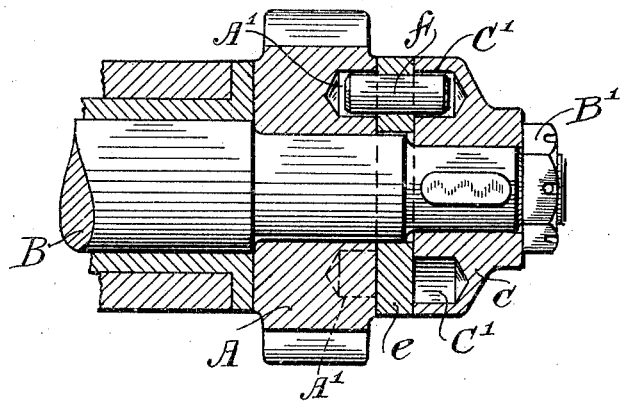
Inventor
Keith R. Manville
By his Attorneys
Redding & Greeley Patented July 9, 1929.

1,720,422

UNITED STATES PATENT OFFICE.

KEITH R. MANVILLE, OF BROOKLYN, NEW YORK, ASSIGNOR TO INTERNATIONAL MOTOR COMPANY, OF NEW YORK, N. Y., A CORPORATION OF DELAWARE.

SHAFT COUPLING.

Application filed January 17, 1923. Serial No. 613,116.

The construction sought to be covered herein is one provided for the purpose of effecting a nice adjustment between any two shafts whose angular relationship is to be fixed, as through meshing gears. The invention is designed primarily with reference to its use for the adjustment of the proper angular relation between a cam shaft and a crank shaft of an internal combustion engine. The principle itself, while embodied heretofore in other constructions is one which lends itself admirably to the particular requirements in internal combustion engine practice and the improvements to be pointed out hereinafter in the application of the principle are characterized by many advantages not heretofore obtainable and which are of importance where facility for assembling and disassembling and convenience and certainty in adjustment are required. The principle involves the use of a varying number of holes or teeth as between two elements, such as disks, which are relatively rotatable, one of the elements being loose on a shaft and the other keyed or otherwise secured thereto. Suitable securing means co-operating with the holes or teeth serve to maintain the two elements in desired angular relation and the varying number of holes or teeth afford that nicety of adjustment which is desired. In accordance with the preferred embodiment of the invention a gear, such as the driving gear for a cam shaft, is mounted loosely on the shaft driven from the crank shaft and the angular position of the gear is fixed by locking therewith a retaining disk which is fixed on the shaft, a securing element extending between alined holes or teeth formed with the gear and the disk, respectively.

One of the principal objects of the invention is to improve the securing device by forming it of such construction and engaging it with the two parts to be locked as to insure the maintenance of the securing element in proper locking engagement therewith. A further object is to provide a locking peg for two relatively adjustable elements on a single shaft which may be handled conveniently when the two parts are brought into adjusted engagement.

The particular features of the invention with which this application is concerned will appear with some particularity hereinafter with reference to the illustrated embodiments wherein:

Figure 1 is a view in section through a gear whose angular relation to its supporting shaft is to be adjusted.

Figure 2 is a view in end elevation of the gear showing the holes with which it is provided in its face.

Figure 3 is a view in end elevation of the retaining disk for the gear and indicating a different number of holes therethrough.

Figure 4 is a view similar to Figure 1 but illustrating another embodiment of the invention in which a spacing washer is provided and used to carry the locking pin.

As shown in Figure 1 a gear $a$ which may be employed, for instance, for driving a cam shaft, is mounted loosely on a shaft $b$ and provision is to be made for securing the gear onto the shaft in adjusted angular relationship therewith. On the end of the shaft is keyed or otherwise secured what will hereinafter be termed a securing disk $c$ to which the gear $a$ may be fastened for rotation with the shaft $b$ as is desired. The improvements have to do with the particular means for securing the gear $a$ to the disk $c$ in adjusted relation which adjustment, of course, provides for the adjustment of the gear with respect to the shaft. In the face of the gear $a$ are formed an annular row of holes $a'$ of any desired cross-section and depth illustrated herein, for convenience, as being circular to receive a cylindrical pin $d$. The disk $c$ is formed also with an annular row of holes $c'$ which, for convenience, may extend through the disk. The number of holes in the face of the gear $a$ and in the disk $c$ will vary by one so that by changing the alinement of holes an angular adjustment between the two elements will be obtained. The nicety of this adjustment depends upon the number of holes in each. In internal combustion engine practice it is essential that parts be accessible for assembling or replacement and in a device of the character illustrated it is particularly important that the adjustment provided be effected readily and certainly. To meet these requirements there is interposed between the gear $a$ and the disk $c$ a plug $d$ which is shouldered so that one end $d'$ is of a different diameter from the other end. In like manner, the holes $a'$ in the gear $a$ are made of greater diameter than the holes $c'$ in the disk $c$ so that when the enlarged end $d$ of the plug is inserted in the holes $a'$ and the disk $c$ then slid onto the shaft $b$ the shoulder $d^2$ of the plug will rest on the inner face of the disk $c$ which thereby prevents displacement of the plug. When adjustment is to be made it is evident that the disk $c$ may be backed off until it clears the plug section $d'$ for insertion of the latter in another pair of registering holes $a'$. A nut $b'$ may be used for finally locking the disk $c$ on the shaft against axial movement.

In the embodiment shown in Figure 4 substantially similar parts correspondingly arranged are provided except that the gear A is separated from the disk C by means of a spacing washer $e$ which carries permanently a pin $f$ which is received by holes $A'$, $C'$, in the proximate faces of the gear A and disk C. These holes in this embodiment may be of the same diameter since the washer $e$ serves not only the purpose of spacing the disk from the gear but the additional purpose of carrying the securing pin $f$ and holding it against accidental displacement or loss when the parts are assembled or adjusted.

A nut $B'$ serves to hold the disk C on the shaft B against axial displacement as described with reference to the nut $B'$.

What I claim is:

In combination with a shaft and a gear mounted loosely thereon and formed with recesses in one face and a disc removably keyed to the shaft and formed with a number of holes greater by one than the number of recesses in the face of the gear, the centers of the recesses and holes defining a single circle concentric with the shaft, a shouldered pin having sections of different diameters, the section of smaller diameter being adapted to rest in one of the holes in the disc and the section of larger diameter being adapted to rest in one of the recesses in the face of the gear when the parts are in assembled relation, said pin being adapted to cooperate selectively with said recesses and said holes to provide a fine degree of axial adjustment for the gear with respect to the shaft.

This specification signed this 15th day of January, A. D. 1923.

KEITH R. MANVILLE.